(12) United States Patent
Fujita

(10) Patent No.: US 9,531,978 B2
(45) Date of Patent: Dec. 27, 2016

(54) IMAGING DEVICE, ELECTRONIC APPARATUS, AND COUNTER INTERFACE CIRCUIT CONNECTED TO A PLURALITY OF DATA LATCHES THAT OUTPUT ANALOG PIXEL SIGNALS

(71) Applicant: Sony Corporation, Tokyo (JP)

(72) Inventor: Takeshi Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 14/517,431

(22) Filed: Oct. 17, 2014

(65) Prior Publication Data

US 2015/0116559 A1 Apr. 30, 2015

(30) Foreign Application Priority Data

Oct. 24, 2013 (JP) .................................. 2013-220751

(51) Int. Cl.
*H04N 5/335* (2011.01)
*H04N 5/378* (2011.01)

(52) U.S. Cl.
CPC .................... *H04N 5/378* (2013.01)

(58) Field of Classification Search
CPC ....................................................... H04N 5/378
See application file for complete search history.

(56) References Cited

U.S. PATENT DOCUMENTS

2009/0040352 A1\* 2/2009 Kawaguchi ............. G06F 3/044
348/308

\* cited by examiner

*Primary Examiner* — Gary C Vieaux
(74) *Attorney, Agent, or Firm* — Sheridan Ross P.C.

(57) ABSTRACT

A solid-state imaging device includes: a large number of column cores configured to output analog outputs of pixels disposed vertically and horizontally in a vertical direction; a large number of data latches configured to hold the analog outputs of the large number of column cores, respectively; a counter interface circuit directly connected to the large number of data latches, and configured to output outputs of the large number of data latches in units of a predetermined number of output channels; and a logic circuit configured to perform digital conversion on the outputs of the large number of data latches being input in units of the predetermined number of output channels through the counter interface circuit.

19 Claims, 15 Drawing Sheets

IMAGING DEVICE, ELECTRONIC APPARATUS, AND COUNTER INTERFACE CIRCUIT CONNECTED TO A PLURALITY OF DATA LATCHES THAT OUTPUT ANALOG PIXEL SIGNALS

CROSS REFERENCE TO RELATED APPLICATIONS

This application claims the benefit of Japanese Priority Patent Application JP 2013-220751 filed Oct. 24, 2013, the entire contents of which are incorporated herein by reference.

BACKGROUND

The present disclosure relates to a solid-state imaging device, an electronic apparatus, and a counter interface circuit. In particular, the present disclosure relates to a solid-state imaging device in which efficiency of data transfer between analog column cores and a digital logic circuit is improved, an electronic apparatus, and a counter interface circuit.

To date, in a solid-state imaging device, an analog pixel signal read out from each pixel has been transferred from a column core to a logic circuit for each column to be converted into a digital pixel signal. This data transfer is performed by a configuration including an H-scanning circuit and a sense amplifier circuit (for example, refer to Japanese Patent No. 4470700).

Specifically, the H-scanning circuit gives a scanning pulse to each of the column cores disposed in the horizontal direction to read out a voltage signal to be an origin of a pixel signal. Then the sense amplifier circuit detects an analog pixel signal on the basis of the readout voltage signal to output the pixel signal to the logic circuit.

SUMMARY

As described above, in a method of giving a scanning pulse from the H-scanning circuit to each of the column cores, pixel signals are transferred from a plurality of columns to the logic circuit at the same time in order to obtain a higher speed. In this case, it has been necessary to rearrange the pixel signals at the logic circuit. Accordingly, it has been necessary to provide a memory, such as an SRAM, or the like for temporarily maintaining the pixel signals in order to perform rearrangement.

Also, when pixel signals are output from the thinned columns, or when pixel signals are output from a part of all the columns, in a related-art technique, pixel signals have been read from all the columns, and then the pixel signals of necessary columns have been extracted. Thereby, the above-described memory has also been necessary for this purpose.

The present disclosure has been made in view of such circumstances. It is desirable to increase efficiency of the data transfer between column cores and a logic circuit in a solid-state imaging device.

According to an embodiment of the present disclosure, there is provided a solid-state imaging device including: a large number of column cores configured to output analog outputs of pixels disposed vertically and horizontally in a vertical direction; a large number of data latches configured to hold the analog outputs of the large number of column cores, respectively; a counter interface circuit directly connected to the large number of data latches, and configured to output outputs of the large number of data latches in units of a predetermined number of output channels; and a logic circuit configured to perform digital conversion on the outputs of the large number of data latches being input in units of the predetermined number of output channels through the counter interface circuit.

In the above-described solid-state imaging device, the counter interface circuit may include multiple stage selector groups, and a predetermined common column number of the data latches may be directly connected to a selector of a first stage selector group.

In the above-described solid-state imaging device, a predetermined common column number of the data latches for each predetermined period of columns may be directly connected to the selector of the first stage selector group.

In the above-described solid-state imaging device, a pair of a predetermined column number of even-numbered column and odd-numbered column of the data latches for each predetermined period of columns may be directly connected to the selector of the first stage selector group.

In the above-described solid-state imaging device, the selector of the first stage selector group may become an active state on the basis of an HSEL pulse output from the logic circuit to start data transfer.

In the above-described solid-state imaging device, after starting data transfer, the selector of the first stage selector group may become an inactive state on the basis of a clock stop signal input from a selector disposed next thereto.

The above-described solid-state imaging device may further include a shift register configured to adjust timing at which the HSEL pulse output from the logic circuit is supplied to each selector of the first stage selector group.

According to another embodiment of the present disclosure, there is provided an electronic apparatus including a solid-state imaging device, the solid-state imaging device including: a large number of column cores configured to output analog outputs of pixels disposed vertically and horizontally in a vertical direction; a large number of data latches configured to hold analog outputs of the large number of column cores, respectively; a counter interface circuit directly connected to the large number of data latches, and configured to output outputs of the large number of data latches in units of a predetermined number of output channels; and a logic circuit configured to perform digital conversion on the outputs of the large number of data latches being input in units of the predetermined number of output channels through the counter interface circuit.

According to another embodiment of the present disclosure, there is provided a counter interface circuit, to which data latches configured to hold data obtained from a solid-state imaging element are connected, and configured to output outputs of a large number of the data latches to a logic circuit in units of a predetermined number of output channels, the counter interface circuit including multiple-stage selector groups, wherein a predetermined common column number of the data latches are directly connected to a selector of a first stage selector group, and the selector of the first stage selector group becomes an active state on the basis of an HSEL pulse output from the logic circuit to start data transfer.

In the above-described embodiments of the present disclosure, outputs of a plurality of data latches are input into the logic circuit for each predetermined number of output channels through the counter interface circuit.

With the above-described embodiment of the present disclosure, it is possible to increase efficiency of the data transfer between column cores and the logic circuit.

With the above-described embodiment of the present disclosure, it is possible to increase efficiency of the data transfer between column cores and the logic circuit in a solid-state imaging device to be mounted.

With the above-described embodiment of the present disclosure, it is possible to increase efficiency of the data transfer when the number of output data buses is small compared with the number of input data buses.

DETAILED DESCRIPTION OF EMBODIMENTS

In the following, a detailed description will be given of a best mode for carrying out the present disclosure (hereinafter referred to as an embodiment) with reference to the drawings.

Figure 1:
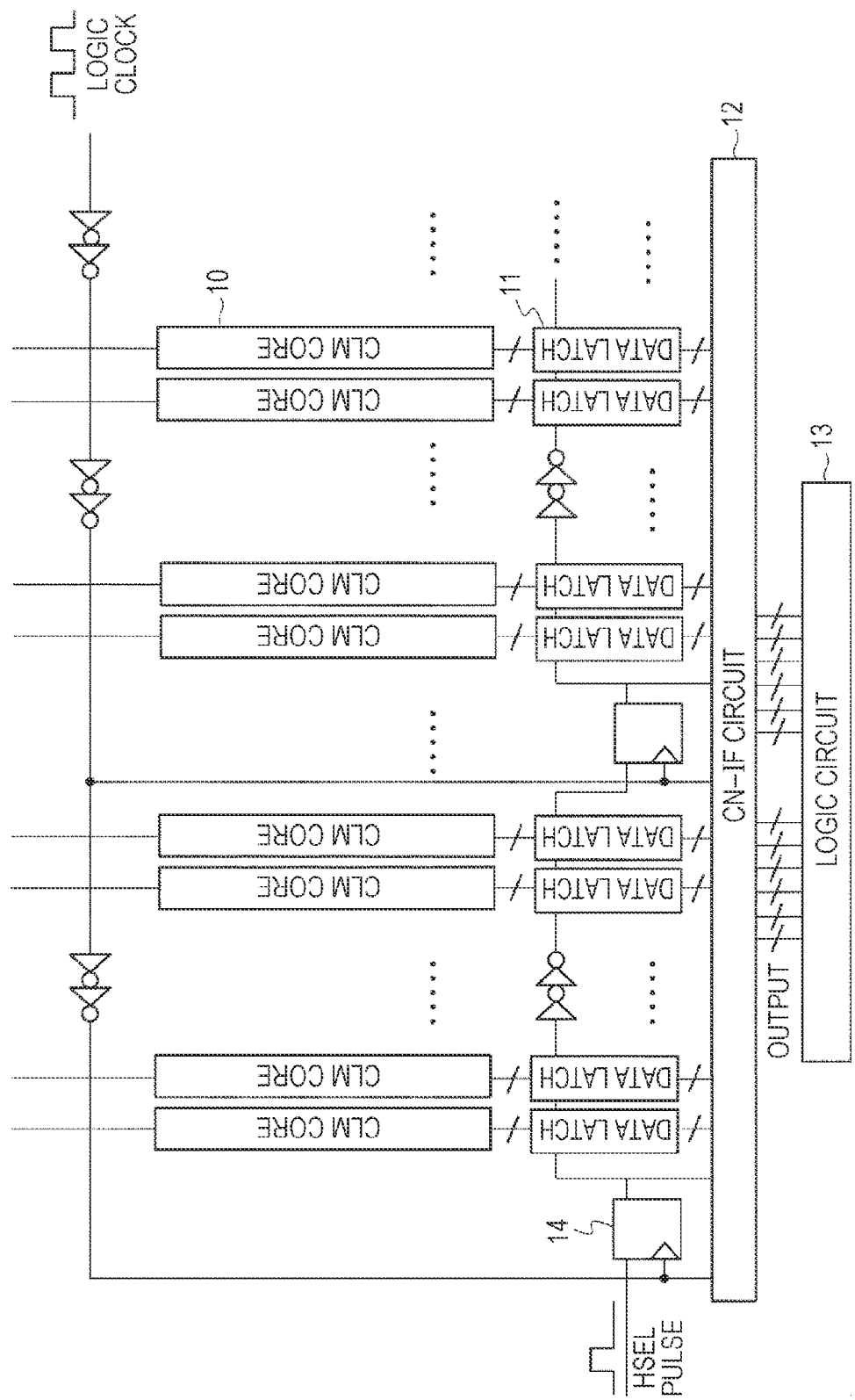
FIG. 1 is a block diagram illustrating an example of a configuration, in which attention is focused on the periphery of column cores, of a solid-state imaging device to which the present disclosure is applied.

Example of Configuration of Periphery of Column Core of Solid-State Imaging Device According to the Present Embodiment FIG. 1 illustrates an example of a configuration, in which attention is focused on the periphery of column cores, of a solid-state imaging device according to the present disclosure.

In this solid-state imaging device, data latches 11 are disposed at the outputs of the column cores 10, which output analog pixel signals that are read out from the pixels disposed vertically and horizontally to the subsequent stage for each column in the vertical direction. The outputs of the data latches 11 are connected to the counter interface (CN-IF) circuit 12, and retention data (the pixel signals) are transferred to a logic circuit 13 through the CN-IF circuit 12. The logic circuit 13 performs digital conversion on the transferred pixel signals, and outputs the signals to the subsequent stage. Also, the logic circuit 13 generates an HSEL pulse for selecting a data latch 11 from which a pixel value is read, and outputs the HSEL pulse to a shift register circuit (FF circuit) 14.

The shift register circuit 14 is disposed for each number of common columns sharing one selector circuit 21 (FIG. 2) of the first selector group of the CN-IF circuit 12, and transfers the HSEL pulse to the CN-IF circuit 12 and the next shift register circuit 14.

In this regard, it is assumed that the number of output buses of the CN-IF circuit 12 (the number of input buses of the logic circuit 13) is greatly reduced compared with the number of input buses (the total number of column cores 10).

Figure 2:
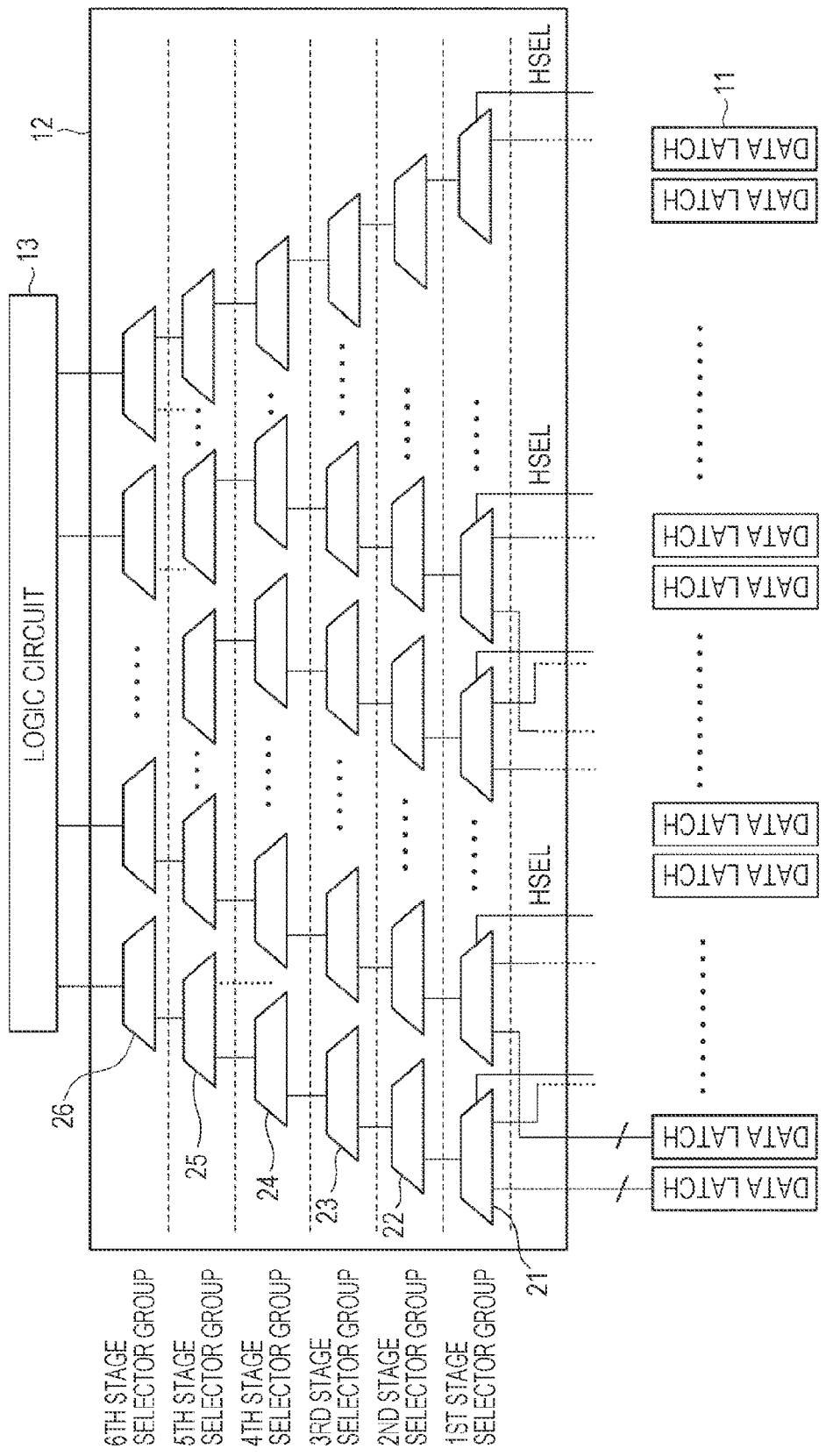
FIG. 2 is a block diagram illustrating an example of a configuration of a counter interface circuit to which the present disclosure is applied.

FIG. 2 illustrates an example of a configuration of the CN-IF circuit 12. The CN-IF circuit 12 has a configuration in which selector groups, each of which includes a plurality of selector circuits, are disposed in a staircase pattern.

FIG. 2 illustrates the case where the CN-IF circuit 12 is formed by six-stage selector groups. Each of the selector circuits 21 included in the first-stage selector group is shared with a plurality of columns that are separated at intervals of predetermined column periods. Each of the selector circuits 21 receives an HSEL pulse, which is generated by the logic circuit 13, and is input through the shift register circuit 14. In this regard, a description will be given later of the disposition of the columns that share the selector circuit 21 with reference to FIG. 4 to FIG. 6.

The number of stages of the selector groups in the CN-IF circuit 12 is determined on the basis of the total number of columns, the number of output buses (the number of output CHs) of the CN-IF circuit 12, and the number of columns sharing one selector circuit 21 of the first-stage selector group (the details will be given later). However, the number of stages, and the number of output buses are also determined depending on the overall layout of the solid-state imaging device, and the output rate of the system, and the like.

In this regard, although the figure is omitted, a FF circuit may be disposed between individual stages of selector groups. By disposing the FF circuit, even if the restriction on the transfer timing between the selector circuits of the individual stages becomes strict in order to increase the transfer rate, it becomes possible to adjust the transfer timing.

Figure 3:
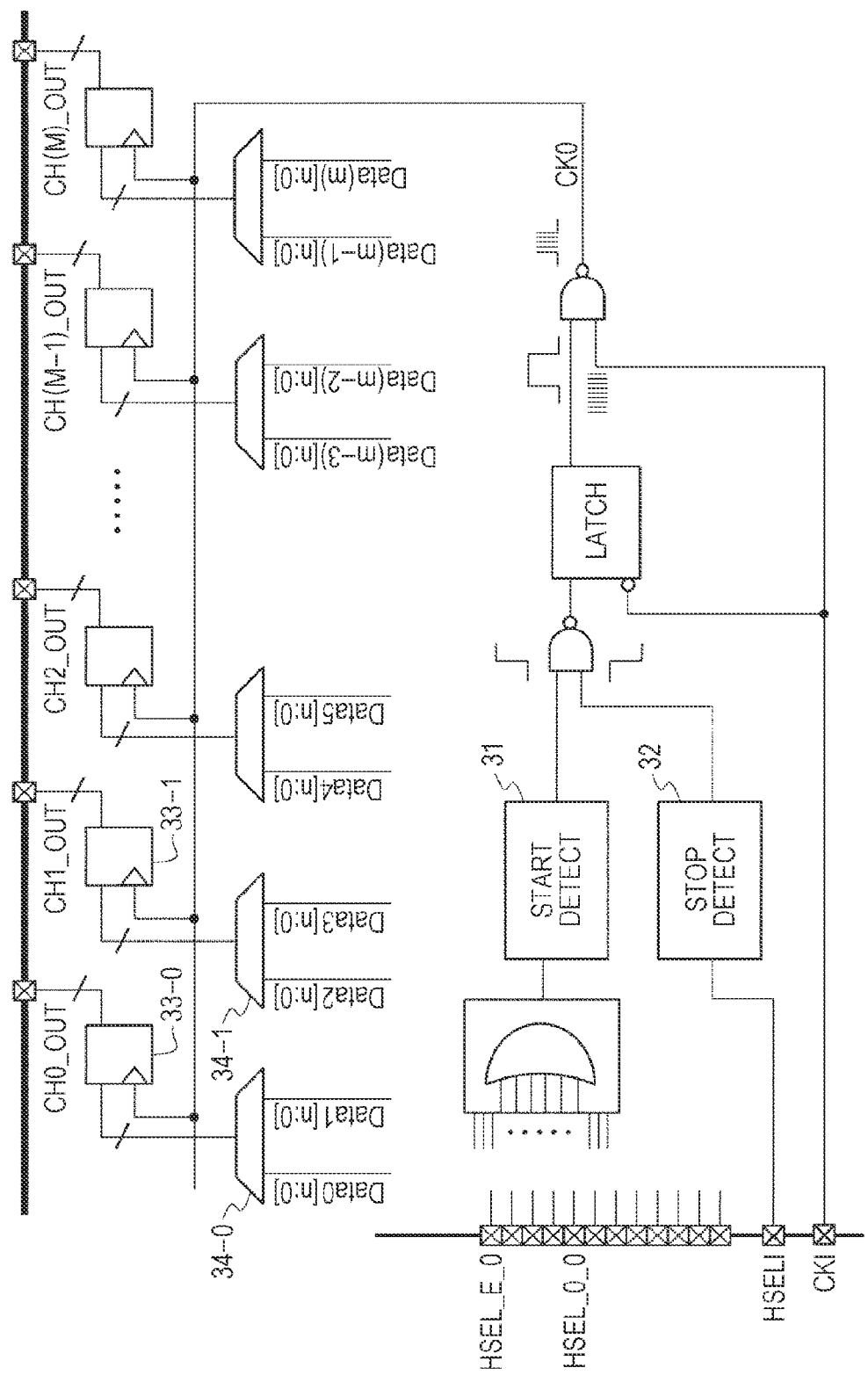
FIG. 3 is a block diagram illustrating an example of a detailed configuration of a selector circuit of the first stage selector group of the counter interface circuit.

FIG. 3 illustrates an example of a detailed configuration of one selector circuit 21 of the first-stage selector group. The selector circuit 21 mainly includes a start pulse detection circuit (START detect) 31, an end pulse detection circuit (STOP detect) 32, a plurality of flip-flop (FF) circuits 33, and a plurality of bit selector circuits 34.

The start pulse detection circuit 31 detects the HSEL pulse for driving the selector circuit 21. When the HSEL pulse is detected, a transfer clock CK0 is supplied to each of the subsequent-stage FF circuits 33. Thereby, the FF circuit 33 and the bit selector circuit 34 become an active state to start data transfer from the selector circuit 21. Also, when the selector circuit 21 stops data transfer, the start pulse detection circuit 31 outputs a flag signal to the next adjacent selector circuit 21 in order to notify that activation will take place in a short time.

When the selector circuit 21 starts data transfer, the end pulse detection circuit 32 outputs a clock stop signal to the before adjacent selector circuit 21. Also, the end pulse detection circuit 32 detects a clock stop signal that was output by the next adjacent selector circuit 21. When the clock stop signal is detected, the supply of the transfer clock CK0 to each of the subsequent stage FF circuits 33 is stopped. Thereby, the active states of the FF circuit 33 and the bit selector circuit 34 are stopped (become an inactive state).

That is to say, the start pulse detection circuit 31, and the end pulse detection circuit 32 change only a circuit that starts data transfer to an active state, and change a circuit that has completed data transfer to an inactive state. Accordingly, it is possible to suppress power consumption of the overall system.

A pair of an even-numbered column and an odd-numbered column (for example, Data0 and Data1, Data2 and Data3, and the like) is input into each of the bit selector circuits 34. Thereby, a decrease in the output rate is prevented when columns are driven with thinning, or when columns are partly driven.

In this regard, the example in FIG. 3 is one example of the configuration of the selector circuit 21, the number of stages increases or decreases in the actual circuit depending on the number of output CHs and the data width (the number of bits).

The illustration is omitted of an example of a configuration of the selector circuit 22, or the like, which is included in each selector group of the second stage or the subsequent stages. The configuration includes only a bit selector circuit unlike the selector circuit 21.

About Sharing Selector Circuit 21

Next, a description will be given of a configuration of sharing the selector circuit 21 with a plurality of columns.

Figure 4:
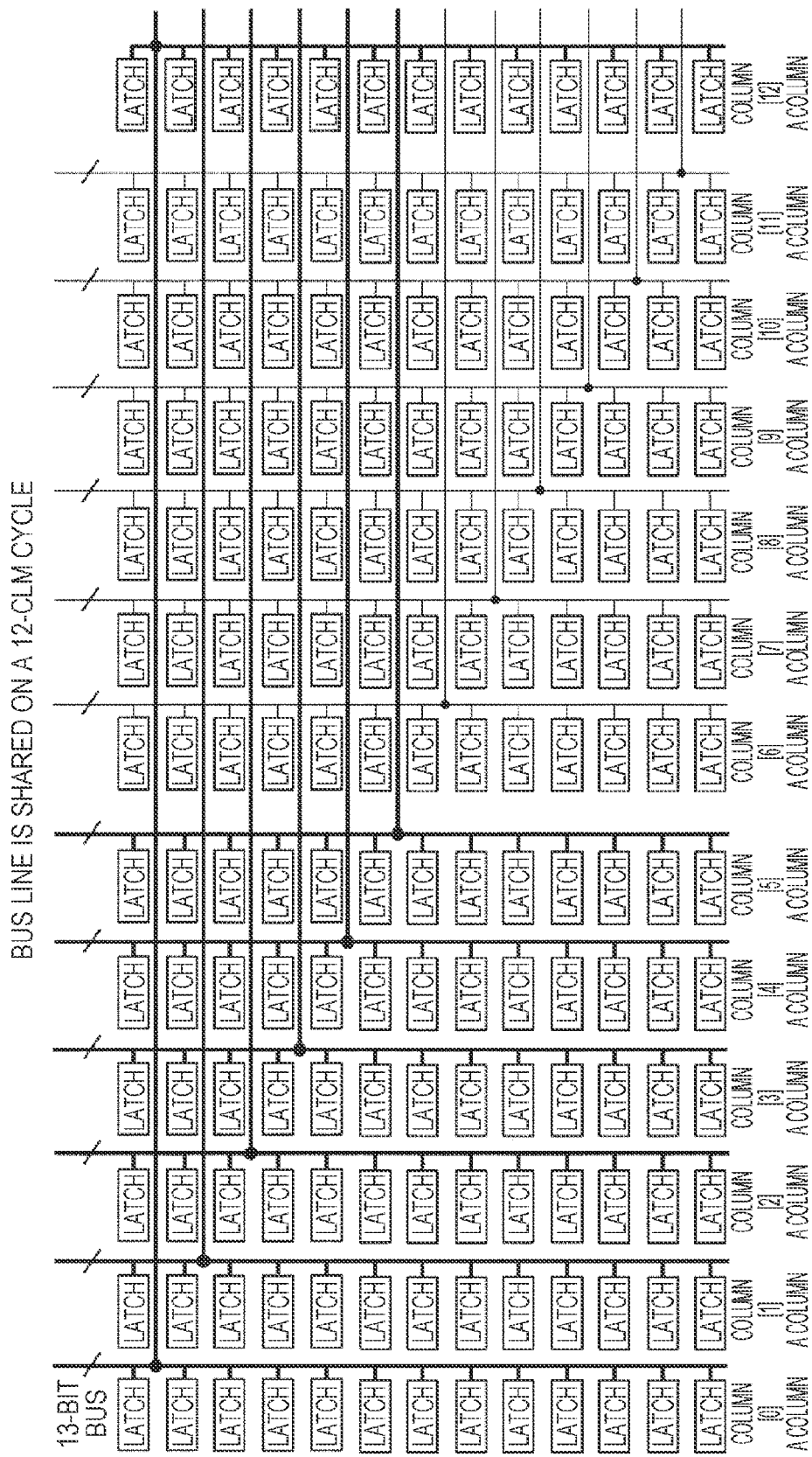
FIG. 4 is a diagram illustrating an example of a configuration in which a selector circuit is shared with a plurality of columns.
Figure 5:
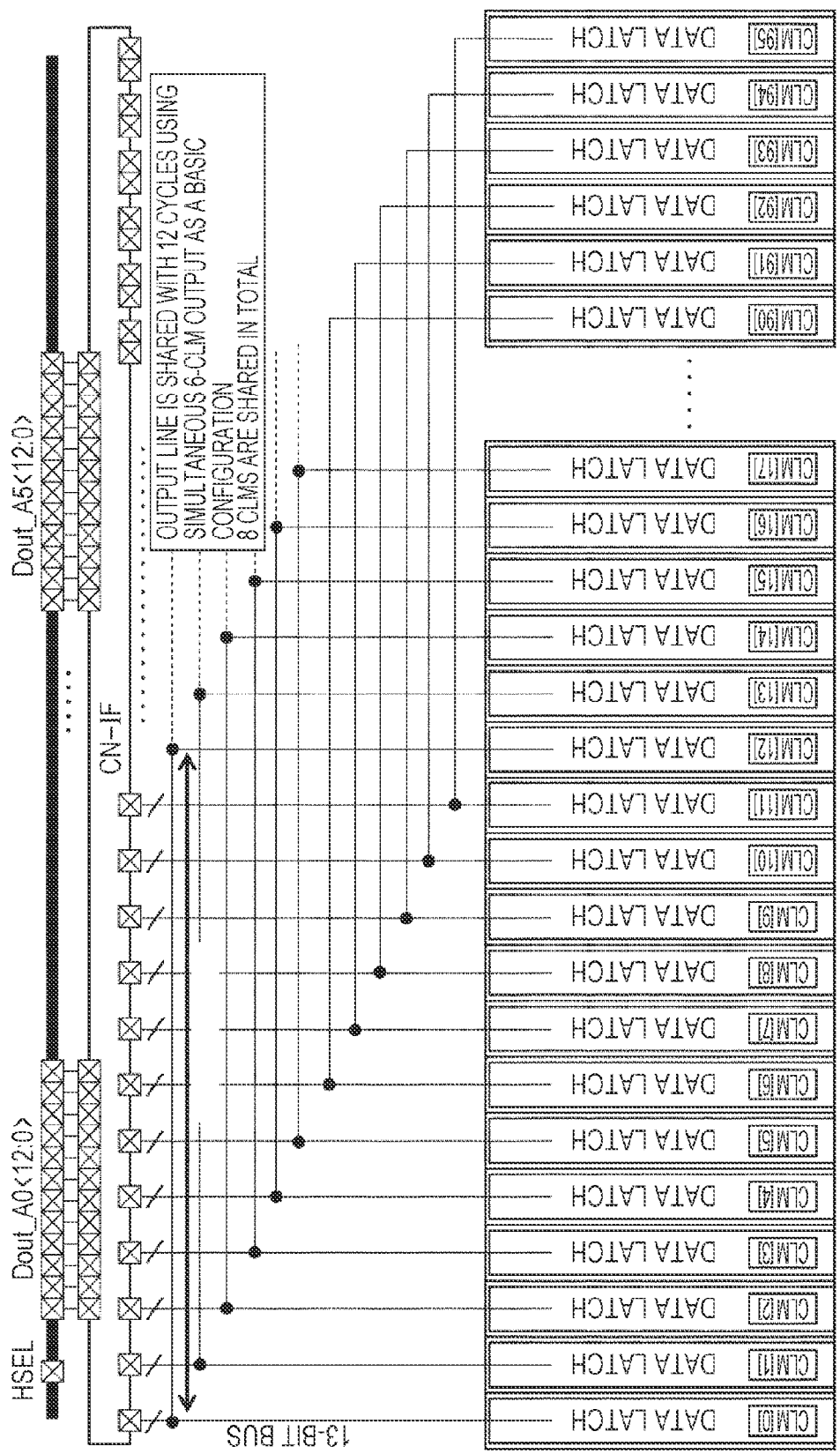
FIG. 5 is a diagram illustrating an example of a configuration in which a selector circuit is shared with a plurality of columns.

FIG. 4 and FIG. 5 illustrate an example of the case where the total number of columns is 96, the output bus of one column has 13 bits, the selector circuit 21 is shared with 8 columns for each 12-column period, and the number of output CHs of the CN-IF circuit 12 is 6. In this case, the number of data wiring lines of the CN-IF circuit 12 becomes 78 (=13 (bits)×6 (CHs)).

In this regard, FIG. 4 illustrates the state in which 13 one-bit latches are disposed for one column. FIG. 5 illustrates the case where 13 one-bit latches illustrated in FIG. 4 are illustrated by one data latch.

In the example illustrated in FIG. 4 and FIG. 5, the first selector circuit 21 is shared with the column [0], the column [12], the column [24] (not illustrated in the figure), . . . , and the adjacent selector circuit 21 thereto is shared with the column [1], the column [13], the column [25] (not illustrated in the figure), . . . .

Figure 6:
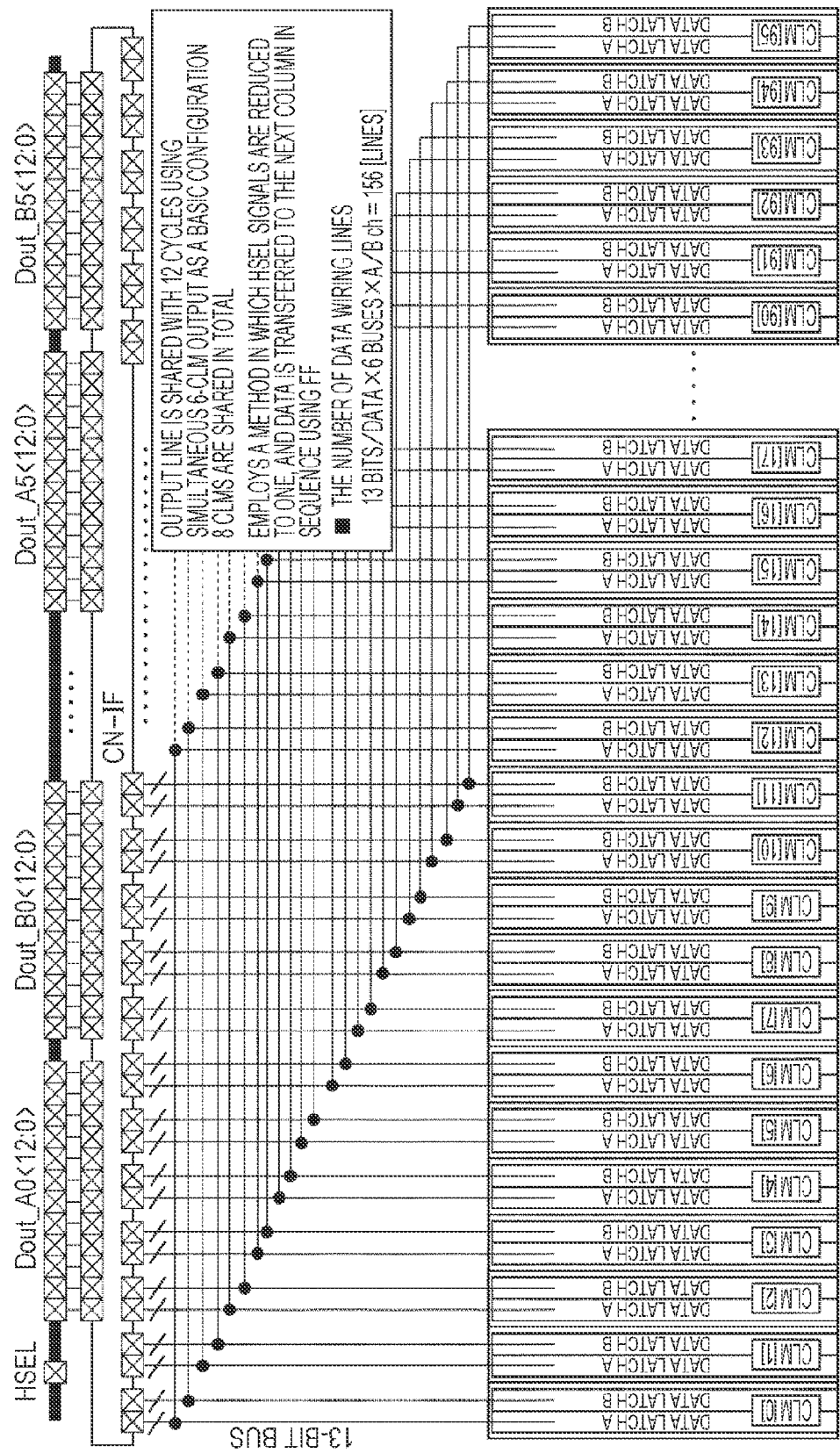
FIG. 6 is a diagram illustrating an example of a column configuration in which a selector circuit is shared with a plurality of columns.

FIG. 6 illustrates an example of a configuration when Ach and Bch are disposed for one column in the longitudinal connection. In this case, the number of wiring lines of the CN-IF circuit 12 becomes 78 (=13 (bits)×6 (CHs)).

Description of Operation

Next, a description will be given of the basic operation sequence. In this regard, it is assumed that the data latch 11 of each column has already held an analog pixel signal.

First, in FIG. 1, an HSEL pulse generated by the logic circuit 13 is supplied to an end shift register circuit 14 among a plurality of shift register circuits 14, and in accordance with this, the transfer gates of a plurality of data latches 11 that are connected to the end selector circuit 21 of the first stage selector group of the CN-IF circuit 12 are opened. At the same time, in FIG. 2, the HSEL pulse is also supplied to the end selector circuit 21 of the first stage selector group of the CN-IF circuit 12, and the HSEL pulse is detected as a start pulse to turn on the transfer clock. Then, the specified bit selector circuit 34 is switched, and data transfer from the selector circuit 21 is started. When this data transfer is completed, a flag signal is output to the next adjacent selector circuit 21.

On the other hand, the HSEL pulse supplied to the end shift register circuit 14 in FIG. 1 is also transferred to the adjacent shift register circuit 14. Here, as described above, the transfer gates of the plurality of data latches 11 that are connected to the second selector circuit 21 from the end are opened. At the same time, the HSEL pulse is also supplied to the second selector circuit 21 from the end in the first stage selector group of the CN-IF circuit 12. The HSEL pulse is detected as a start pulse to turn on the transfer clock, the specified bit selector circuit 34 is switched, and the data transfer from the selector circuit 21 is started. The selector circuit 21 outputs a clock stop signal to the end selector circuit 21, which is located before adjacent, in accordance with the start of the data transfer. When this data transfer is completed, a flag signal is output to the next adjacent selector circuit 21.

For the subsequent stages, the pixel signals are output from all the columns by each of the selector circuits 21 being driven in the same manner.

Specific Example of Reading Pixel Signal from Column

Figure 7:
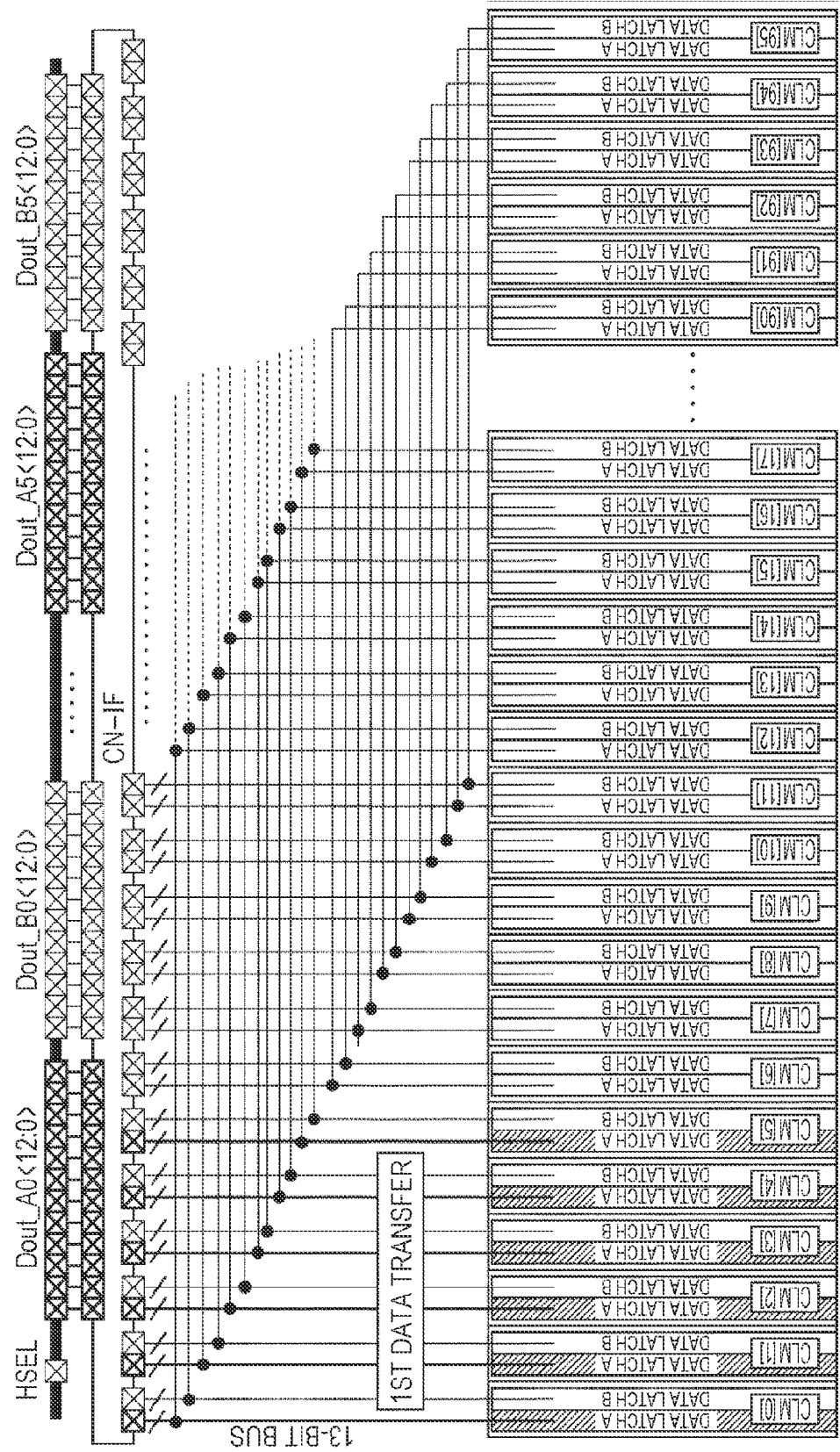
FIG. 7 is a diagram illustrating normal readout in the example of the configuration in FIG. 6.
Figure 8:
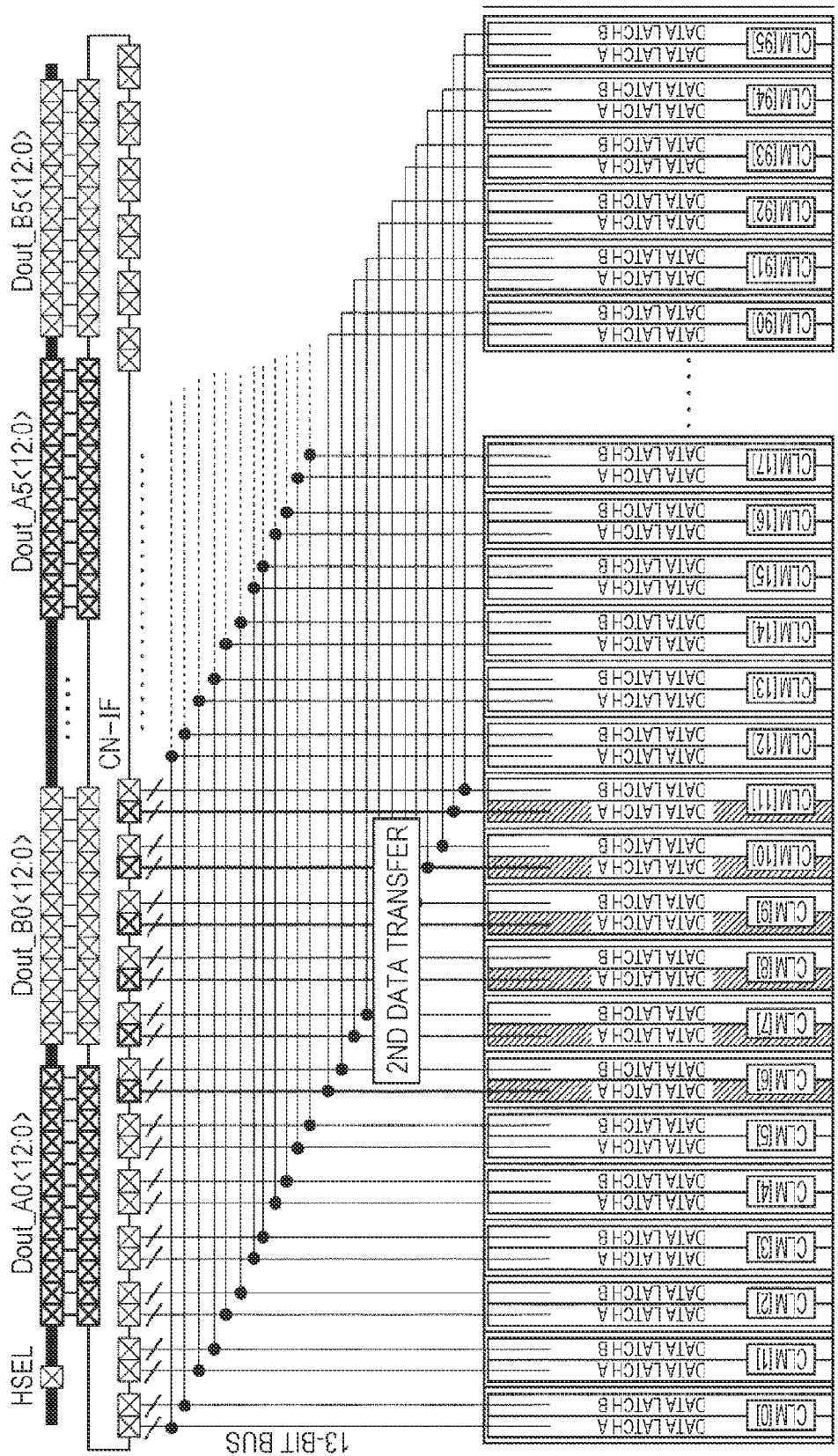
FIG. 8 is a diagram illustrating normal readout in the example of the configuration in FIG. 6.
Figure 9:
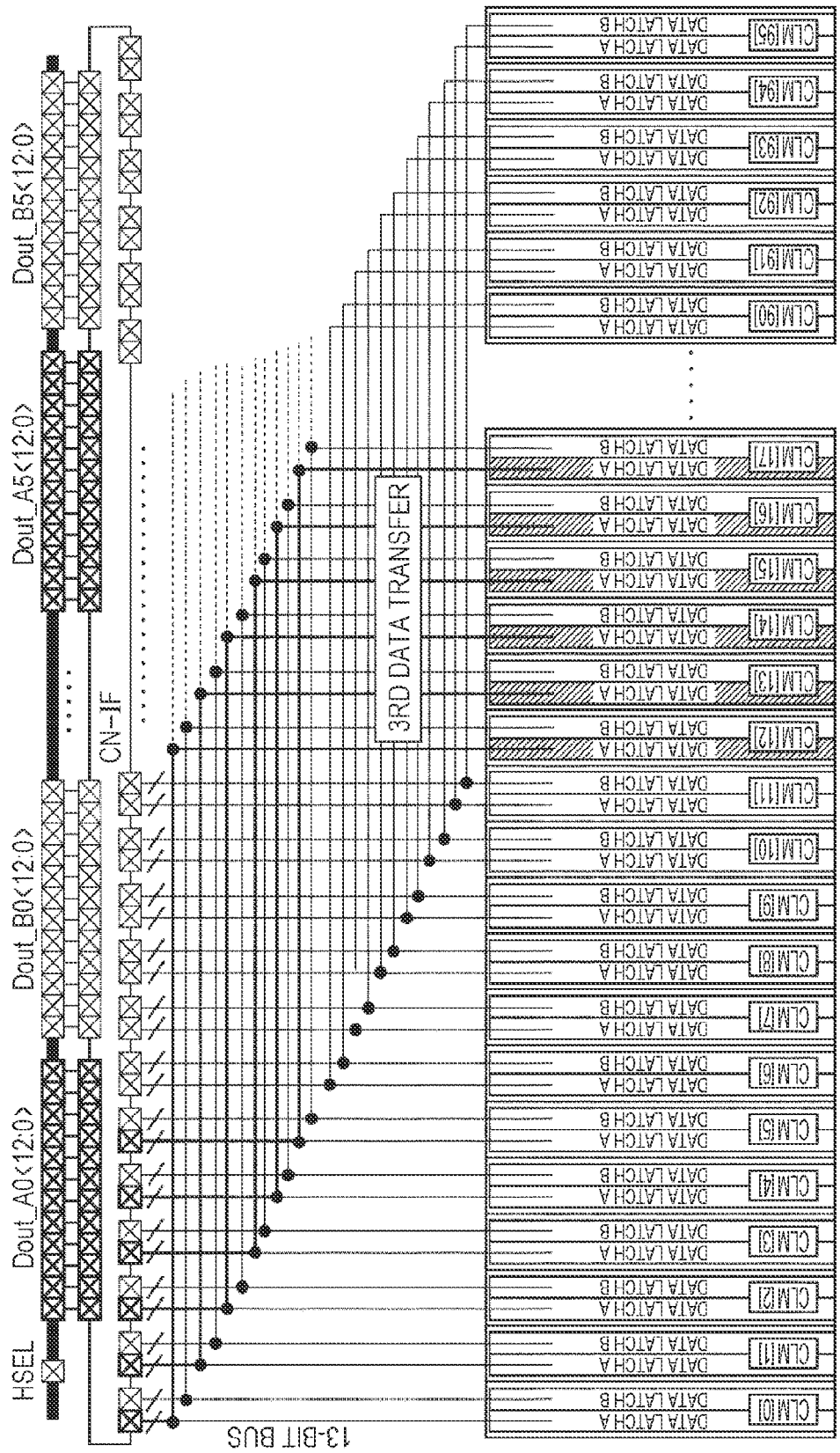
FIG. 9 is a diagram illustrating normal readout in the example of the configuration in FIG. 6.

FIG. 7 to FIG. 9 illustrate the first data transfer, the second data transfer, and the third data transfer of normal readout in the example of column sharing illustrated in FIG. 6, respectively. As illustrated in each of the figures, it is possible to output 6-column pixel signals at the same time by each data transfer.

Figure 10:
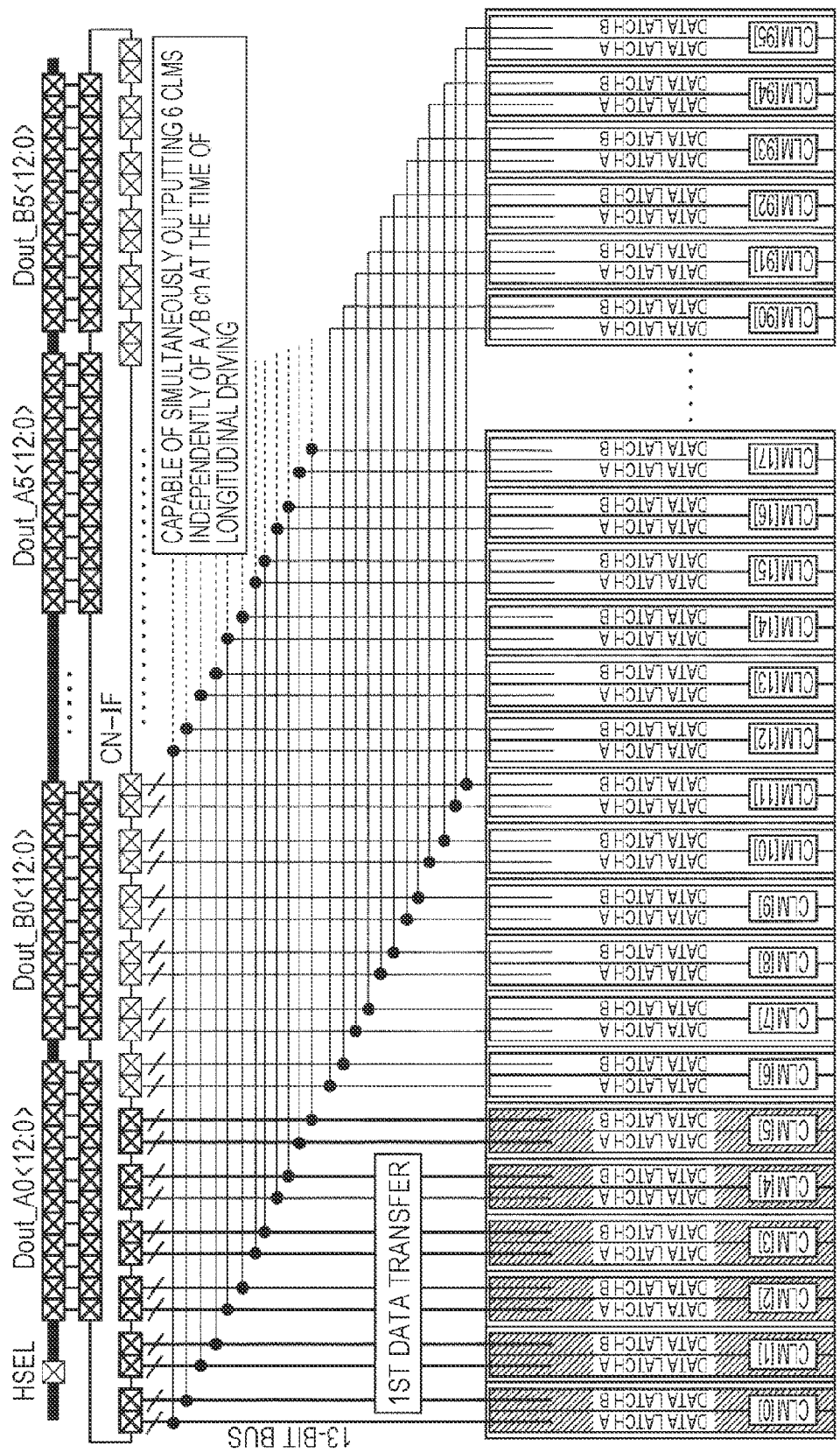
FIG. 10 is a diagram illustrating longitudinal readout in the example of the configuration in FIG. 6.
Figure 11:
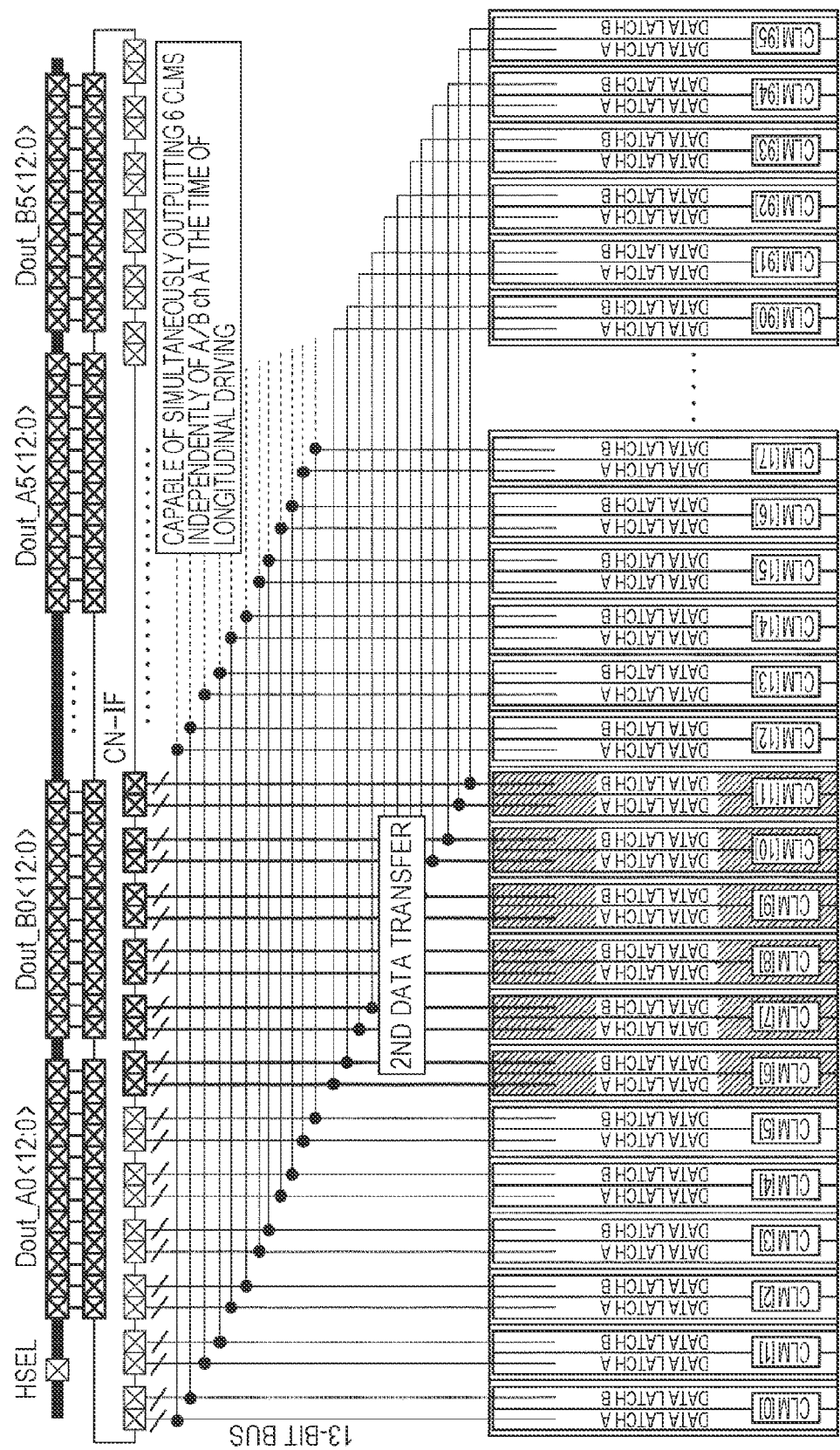
FIG. 11 is a diagram illustrating longitudinal readout in the example of the configuration in FIG. 6.
Figure 12:
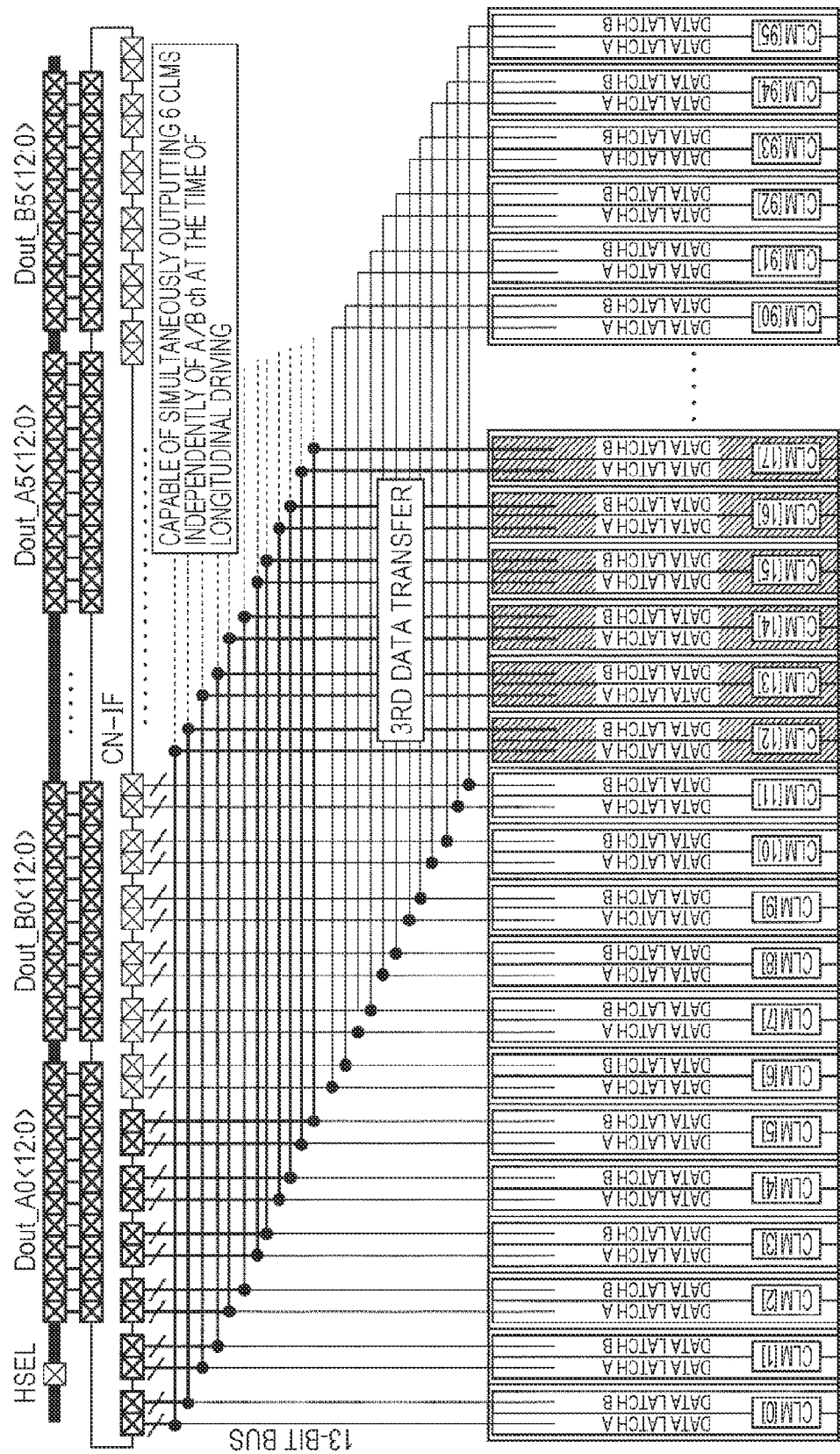
FIG. 12 is a diagram illustrating longitudinal readout in the example of the configuration in FIG. 6.

FIG. 10 to FIG. 12 illustrate the first data transfer, the second data transfer, and the third data transfer of longitudinal reading in the example of column sharing illustrated in FIG. 6, respectively. In this case, it is possible to output 6-column pixel signals at the same time independently of Ach and Bch of each column.

Figure 13:
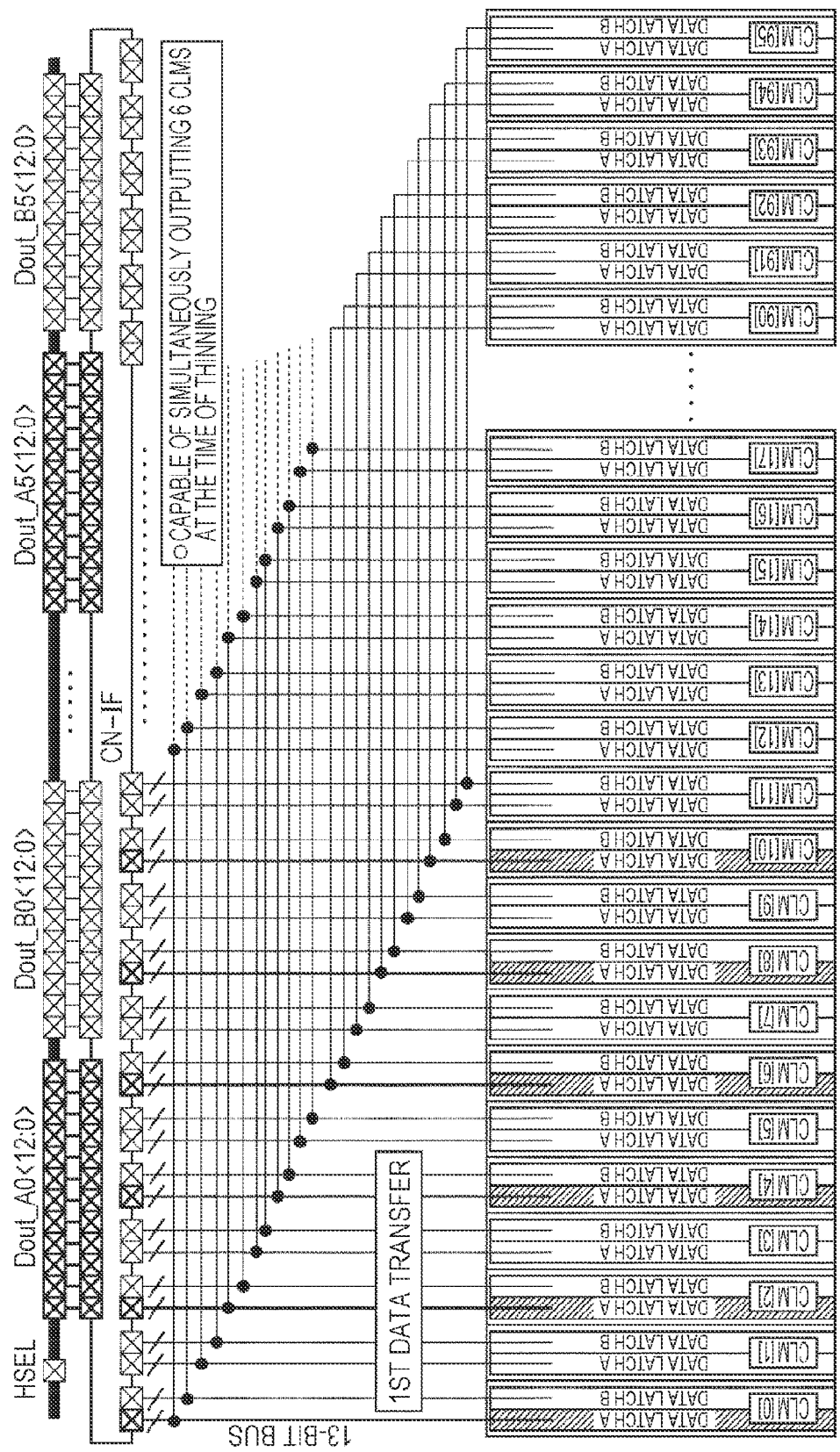
FIG. 13 is a diagram illustrating thinning readout in the example of the configuration in FIG. 6.
Figure 14:
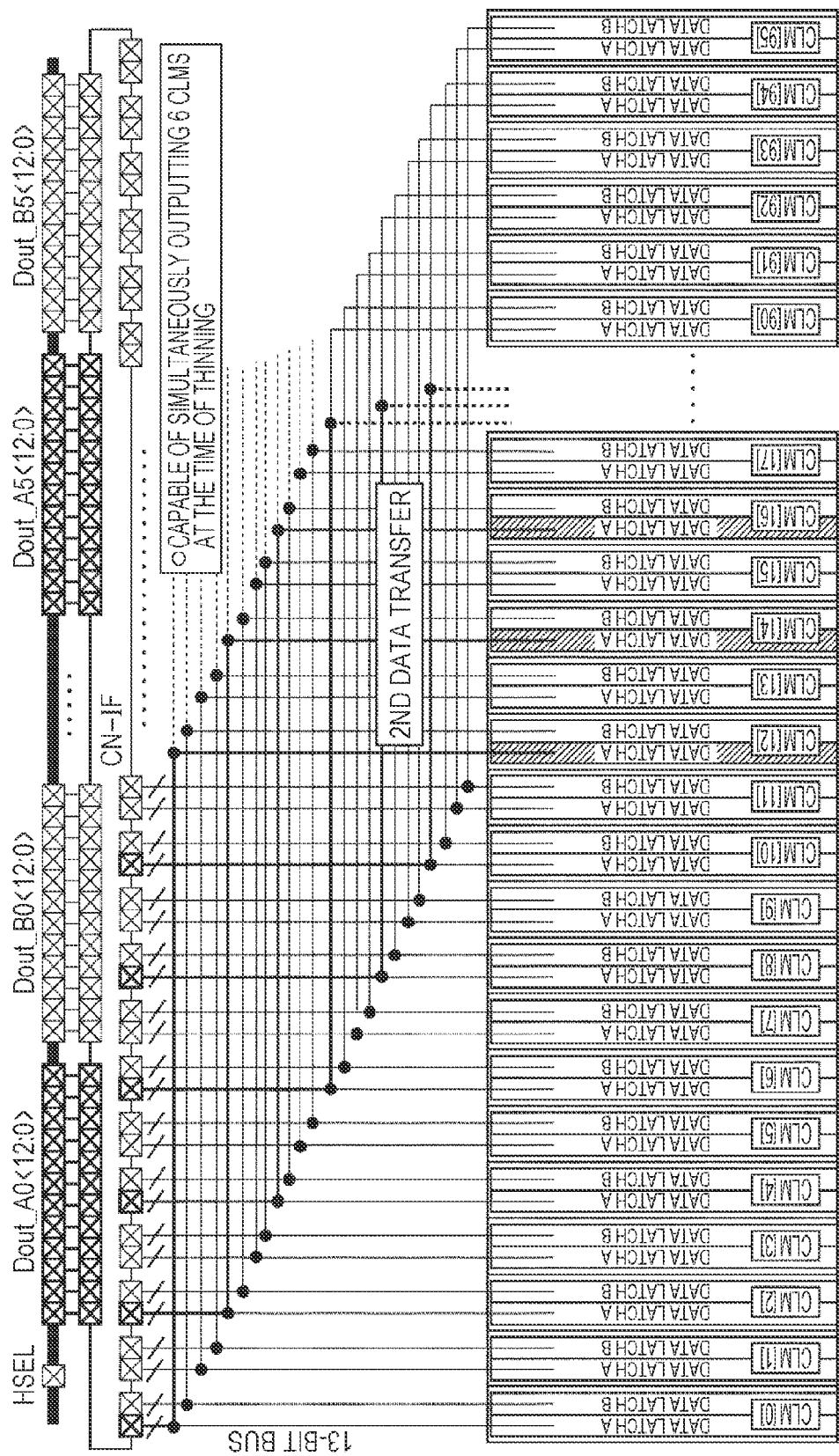
FIG. 14 is a diagram illustrating thinning readout in the example of the configuration in FIG. 6.

FIG. 13 and FIG. 14 illustrate the first data transfer, and the second data transfer of thinning reading at intervals of one column in the example of column sharing illustrated in FIG. 6. In this case, it is possible to output 6-column pixel signals at the same time by each data transfer.

About the Number of Stages of Selector Group in CN-IF Circuit 12

Next, a description will be given of the number of stages of a selector group in the CN-IF circuit 12.

In order to determine the number S of stages of the selector group in the CN-IF circuit 12, first, the total number N of columns, the number O of output buses (the number of output CHs) of the CN-IF circuit 12, and the number K of columns sharing one selector circuit 21 in the first stage selector group are determined. Then, the number M of the selector circuits 21 of the first stage selector group is determined on the basis of a relationship of the following expression (1).

$$N = 2 \times M \times K \times O \tag{1}$$

Next, the number S of stages is determined on the basis of the following expression (2).

$$S = \text{ROUNDUP}(\log(M, 2), 0) + 1 \tag{2}$$

Figure 15:
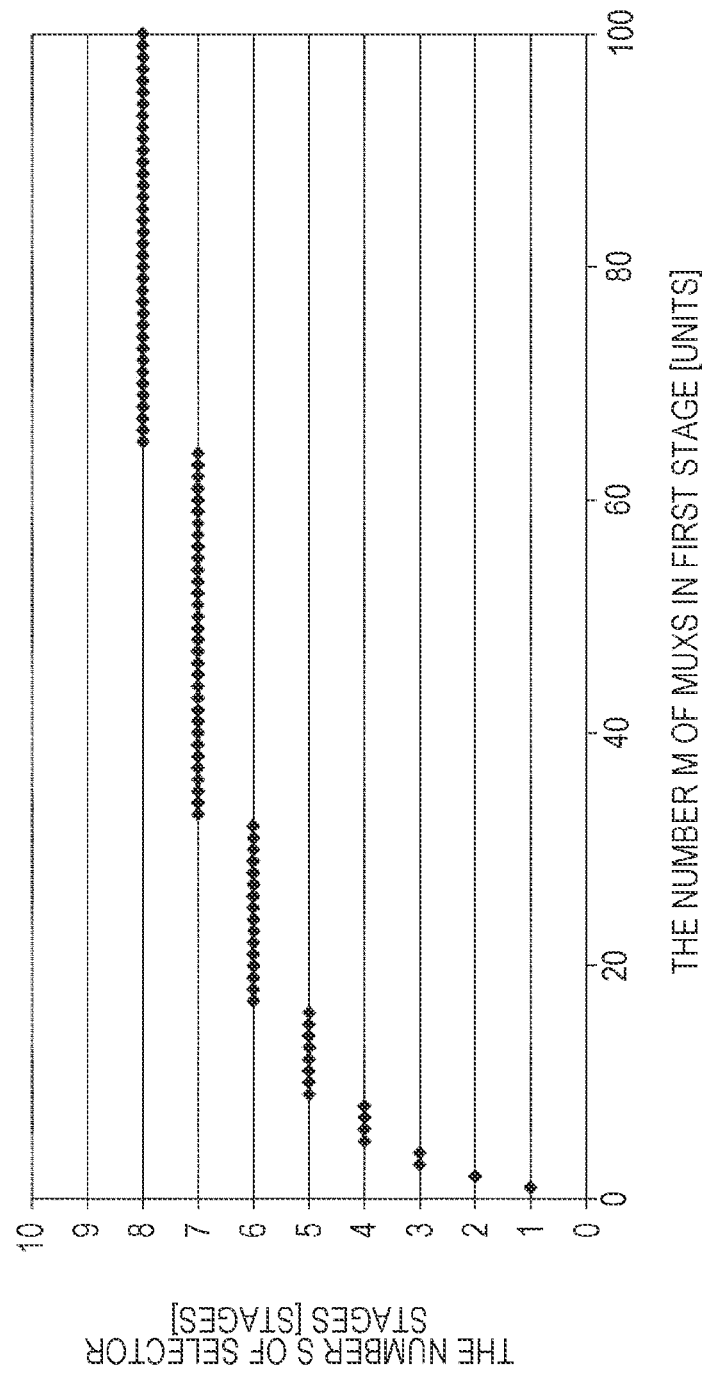
FIG. 15 is an explanatory diagram illustrating a relationship between the number S of selector group stages of the counter interface circuit, and the number M of selector circuits in the first stage selector group.

In this regard, the relationship between the number M of the selector circuits 21 in the first stage selector group in the expression (2), and the number S of stages is as illustrated in FIG. 15.

For example, if it is assumed that the total number of columns N=2706, the number of output buses O=6, and the number of columns of the selector circuit 21 K=8, the number M of the selector circuits 21 in the first stage selector group is determined to be 28 from the expression (1). Next, the number of stages S=6 is derived from the expression (2).

SUMMARY

As described above, with the present disclosure, it becomes unnecessary to perform rearrangement of pixel signals, which has been performed in the inside of the logic circuit until now. Accordingly, it becomes unnecessary to dispose a memory, such as an SRAM, or the like, which has been provided for the exclusive use of the rearrangement.

Also, with the present disclosure, only the circuit connected to the column from which data is transferred becomes active, and the other circuits become inactive, and thus it is possible to achieve power saving.

Further, it is possible to perform data transfer without decreasing the output rate in the case of performing thinning readout from all the columns, or partly reading out the columns.

In this regard, it is possible to apply a solid-state imaging device according to the present embodiment to any electronic apparatuses on which the solid-state imaging device is mounted as an image sensor.

Also, the present embodiment is not limited to the above-described embodiments, and it is possible to make various variations without departing from the spirit and scope of the present disclosure.

It is possible to configure the present disclosure as follows.

(1) A solid-state imaging device including:
a large number of column cores configured to output analog outputs of pixels disposed vertically and horizontally in a vertical direction;
a large number of data latches configured to hold the analog outputs of the large number of column cores, respectively;
a counter interface circuit directly connected to the large number of data latches, and configured to output outputs of the large number of data latches in units of a predetermined number of output channels; and
a logic circuit configured to perform digital conversion on the outputs of the large number of data latches being input in units of the predetermined number of output channels through the counter interface circuit.

(2) The solid-state imaging device according to (1),
wherein the counter interface circuit includes multiple stage selector groups, and
a predetermined common column number of the data latches are directly connected to a selector of a first stage selector group.

(3) The solid-state imaging device according to (2),
wherein a predetermined common column number of the data latches for each predetermined period of columns are directly connected to the selector of the first stage selector group.

(4) The solid-state imaging device according to (2) or (3), wherein a pair of a predetermined column number of even-numbered column and odd-numbered column of the data latches for each predetermined period of columns are directly connected to the selector of the first stage selector group.

(5) The solid-state imaging device according to any one of (2) to (4),
wherein the selector of the first stage selector group becomes an active state on the basis of an HSEL pulse output from the logic circuit to start data transfer.

(6) The solid-state imaging device according to any one of (2) to (5),
wherein after starting data transfer, the selector of the first stage selector group becomes an inactive state on the basis of a clock stop signal input from a selector disposed next thereto.

(7) The solid-state imaging device according to any one of (2) to (6), further including
a shift register configured to adjust timing at which the HSEL pulse output from the logic circuit is supplied to each selector of the first stage selector group.

(8) An electronic apparatus including a solid-state imaging device, the solid-state imaging device including:
a large number of column cores configured to output analog outputs of pixels disposed vertically and horizontally in a vertical direction;
a large number of data latches configured to hold analog outputs of the large number of column cores, respectively;
a counter interface circuit directly connected to the large number of data latches, and configured to output outputs of the large number of data latches in units of a predetermined number of output channels; and
a logic circuit configured to perform digital conversion on the outputs of the large number of data latches being input in units of the predetermined number of output channels through the counter interface circuit.

(9) A counter interface circuit, to which data latches configured to hold data obtained from a solid-state imaging element are connected, and configured to output outputs of a large number of the data latches to a logic circuit in units of a predetermined number of output channels, the counter interface circuit including
multiple-stage selector groups,
wherein a predetermined common column number of the data latches are directly connected to a selector of a first stage selector group, and
the selector of the first stage selector group becomes an active state on the basis of an HSEL pulse output from the logic circuit to start data transfer.

What is claimed is:
1. An imaging device comprising:
a plurality of column cores configured to output analog pixel signals of pixels disposed vertically and horizontally in a vertical direction;
a plurality of data latches configured to hold the analog pixel signals of the plurality of column cores, respectively;
a counter interface circuit directly connected to the plurality of data latches, and configured to output the analog pixel signals of the plurality of data latches in units of a predetermined number of output channels; and
a logic circuit configured to perform digital conversion on the analog pixel signals output from the plurality of data latches being input in units of the predetermined number of output channels through the counter interface circuit.

2. The imaging device according to claim 1,
wherein the counter interface circuit includes multiple stage selector groups, and
a plurality of data latches is directly connected to a selector of a first stage selector group.

3. The imaging device according to claim 2,
wherein data latches of a plurality of columns that are separated at intervals of a predetermined number of columns are directly connected to the selector of the first stage selector group.

4. The imaging device according to claim 2,
wherein even-numbered columns and odd-numbered columns of the data latches are directly connected to the selector of the first stage selector group.

5. The imaging device according to claim 2,
wherein the selector of the first stage selector group becomes an active state based on a pulse output from the logic circuit to start data transfer.

6. The imaging device according to claim 5,
wherein after starting data transfer, the selector of the first stage selector group becomes an inactive state on the basis of a clock stop signal input from a selector disposed next thereto.

7. The imaging device according to claim 5, further comprising:
a shift register configured to adjust timing at which the pulse output from the logic circuit is supplied to each selector of the first stage selector group.

8. An electronic apparatus including an imaging device, the imaging device comprising:
a plurality of column cores configured to output analog pixel signals of pixels disposed vertically and horizontally in a vertical direction;
a plurality of data latches configured to hold analog pixel signals of the large number of column cores, respectively;
a counter interface circuit directly connected to the plurality of data latches, and configured to output the analog pixel signals of the plurality of data latches in units of a predetermined number of output channels; and
a logic circuit configured to perform digital conversion on the analog pixel signals output from the plurality of data latches being input in units of the predetermined number of output channels through the counter interface circuit.

9. The electronic apparatus according to claim 8,
wherein the counter interface circuit includes multiple stage selector groups, and
a plurality of data latches is directly connected to a selector of a first stage selector group.

10. The electronic apparatus according to claim 9,
wherein data latches of a plurality of columns that are separated at intervals of a predetermined number of columns are directly connected to the selector of the first stage selector group.

11. The electronic apparatus according to claim 9,
wherein even-numbered columns and odd-numbered columns of the data latches are directly connected to the selector of the first stage selector group.

12. The electronic apparatus according to claim 9,
wherein the selector of the first stage selector group becomes an active state based on a pulse output from the logic circuit to start data transfer.

13. The electronic apparatus according to claim 12,
wherein after starting data transfer, the selector of the first stage selector group becomes an inactive state on the basis of a clock stop signal input from a selector disposed next thereto.

14. The electronic apparatus according to claim 12, further comprising:
a shift register configured to adjust timing at which the pulse output from the logic circuit is supplied to each selector of the first stage selector group.

15. A counter interface circuit, to which data latches configured to hold data obtained from an imaging element are connected, and configured to output analog pixel signals of a plurality of the data latches to a logic circuit in units of a predetermined number of output channels, the counter interface circuit comprising:
multiple-stage selector groups, wherein a plurality of data latches is directly connected to a selector of a first stage selector group, and
the selector of the first stage selector group becomes an active state on the basis of a pulse output from the logic circuit to start data transfer.

16. The counter interface circuit according to claim 15,
wherein data latches of a plurality of columns that are separated at intervals of a predetermined number of columns are directly connected to the selector of the first stage selector group.

17. The counter interface circuit according to claim 15,
wherein even-numbered columns and odd-numbered columns of the data latches are directly connected to the selector of the first stage selector group.

18. The counter interface circuit according to claim 15,
wherein after starting data transfer, the selector of the first stage selector group becomes an inactive state on the basis of a clock stop signal input from a selector disposed next thereto.

19. The imaging device according to claim 15, further comprising:
a shift register configured to adjust timing at which the pulse output from the logic circuit is supplied to each selector of the first stage selector group.

* * * * *